United States Patent [19]

Shinohara et al.

[11] 4,281,891
[45] Aug. 4, 1981

[54] DEVICE FOR EXCELLENTLY COUPLING A LASER BEAM TO A TRANSMISSION MEDIUM THROUGH A LENS

[75] Inventors: Tsuneo Shinohara; Hiroo Yonezu, both of Tokyo, Japan

[73] Assignee: Nippon Electric Co., Ltd., Tokyo, Japan

[21] Appl. No.: 23,917

[22] Filed: Mar. 26, 1979

[30] Foreign Application Priority Data

Mar. 27, 1978 [JP] Japan .................... 53/39540[U]
Jul. 19, 1978 [JP] Japan .................... 53/88757

[51] Int. Cl.³ ............................... G02B 5/14
[52] U.S. Cl. .................. 350/96.18; 250/552; 350/96.20
[58] Field of Search ............ 350/96.18, 96.20; 250/227, 552

[56] References Cited

U.S. PATENT DOCUMENTS

| | | | |
|---|---|---|---|
| 3,894,789 | 7/1975 | Kobayashi et al. | 350/96.18 |
| 3,950,075 | 4/1976 | Cook et al. | 350/96.18 |
| 3,996,526 | 12/1976 | d'Auria et al. | 350/96.20 |
| 4,119,362 | 10/1978 | Holzman | 350/96.18 |
| 4,119,363 | 10/1978 | Camlibel et al. | 350/96.20 |

OTHER PUBLICATIONS

M. L. Dakss "Coupling Light Sources to Fibers", *Laser Focus* Dec. 1975, pp. 31-34.

*Primary Examiner*—Stewart J. Levy
*Attorney, Agent, or Firm*—Sughrue, Mion, Zinn, Macpeak and Seas

[57] ABSTRACT

A device for coupling a laser beam to an end surface of an optical fiber comprises a beam converging lens, a holder for the fiber, a block of a solid material, and a mass of a binder between the block and the end surface and between the block and the holder. The lens and the holder are fixed to each other so as to make the laser beam focus on the end surface. Use is preferred of an arrangement comprising a first and a second holder in which the holders have axial lines, respectively, and hold a laser element for the laser beam and the lens with a beam axis of the laser beam and an optical axis of the lens rendered coincident with the respective axial lines and in which the holders are fixed to each other with the axial lines aligned. The arrangement is effective also in coupling the laser beam to a general transmission medium. Instead of using the arrangement, a lens holder may be fixed to the fiber holder and then to a laser element holder so as to make the laser beam focus on the optical fiber end surface. A nonreflecting coating is desirable on the block at a portion exposed to the incident laser beam either when the laser beam is incident onto the block with a small angle of convergence or when the block is thin. The solid material, the binder, and the optical fiber usually have an approximately equal refractive index.

19 Claims, 7 Drawing Figures

DEVICE FOR EXCELLENTLY COUPLING A LASER BEAM TO A TRANSMISSION MEDIUM THROUGH A LENS

BACKGROUND OF THE INVENTION

This invention relates to a device for coupling a laser beam to a transmission medium, such as an optical fiber.

As a result of recent progress in GaAs.GaAlAs heterojunction lasers, it has become possible to readily supply a laser element having a total life of over ten thousand hours with an optical output of several miliwatts in continuous-wave operation at room temperature. This has rendered applications of a semiconductor laser element to optical communication and others more prosperous and practical.

In an optical communication system, an optical fiber is used as a transmission medium for transmitting a laser beam that carries information to be transmitted. An optical fiber may comprise a light guide of quartz or glass and a sheath of a synthetic resin, such as a polyamide resin known as nylon, that covers the guide. Alternatively, the light guide may be a glass fiber that has a refractive index varied along the radius and is known in the art as a "Selfoc" fiber by a trademark "Selfoc" of Nippon Selfoc Company, Limited, of Tokyo, Japan. The laser beam is caused to enter an optical fiber at an end surface thereof.

In such an optical communication system, it is highly desirable to couple a laser beam to an end surface of an optical fiber with a highest possible efficiency. Use of a lens in a device for carrying out the coupling is already known. The lens makes a divergent laser beam emitted by a laser element focus on the end surface that has a very narrow area, such as about 60 microns in diameter.

Describing more in detail, a portion of the laser beam incident on the optical fiber end surface is inevitably reflected by the end surface to reduce the efficiency of the coupling. In addition, the reflected portion of the laser beam returns to the laser element to render the operation thereof unstable. This results in an increase in noises undesiredly superposed on the information being transmitted and unavoidable variations or fluctuations in both static and dynamic characteristics of the laser element, such as the input current versus optical output characteristics, and accordingly in the modulation characteristics. The reflected portion of the laser beam more adversely affects the laser operation when the coupling is stronger. The reflection is therefore fatal to optical communication.

Speaking generally of the semiconductor laser elements, it is very often desirable that a laser beam emitted by such a laser element be coupled to a transmission medium through a lens. A laser element accompanied by a lens at a portion of its housing or package is already known. A laser device of the type accompanied by a lens as an entirety is, however, bulky and inconvenient to handle.

SUMMARY OF THE INVENTION

It is therefore a primary object of the present invention to provide a device for coupling a laser beam to or from an optical fiber with a high efficiency.

It is another object of this invention to provide a device of the type described, which is compact and is readily handled.

It is still another object of this invention to provide a device of the type described, in which reflection of the laser beam at an end surface of the optical fiber is reduced to a minimum to make a laser element stably emit the laser beam.

It is another primary object of this invention to provide a device for coupling a laser beam to a transmission medium through a lens, which device is compact and convenient to handle.

According to this invention, there is provided a device for coupling a laser beam emitted by a laser element to an optical fiber having an end surface, which comprises a beam converging lens responsive to the laser beam for producing a reshaped laser beam, a fiber holder for holding the optical fiber with the end surface exposed, a block of a solid material transparent to the reshaped laser beam and having a first and a second surface, a mass of a binder transparent to the reshaped laser beam between the second and the end surfaces and between the second surface and the fiber holder, and fixing means for fixing the lens and the fiber holder to each other with the first surface made to receive the reshaped laser beam and with the reshaped laser beam made to focus substantially on the end surface through the block and the binder mass.

According to an aspect of this invention, there is provided a device for coupling a laser beam emitted by a laser element to an optical fiber having an end surface, which comprises a beam converging lens having an optical axis and responsive to the laser beam for producing a reshaped laser beam, a fiber holder having a predetermined axis for holding the optical fiber with the end surface exposed and situated on the predetermined axis, a block of a solid material transparent to the reshaped laser beam and having a first and a second surface, a mass of a binder transparent to the reshaped laser beam between the second and the end surfaces and between the second surface and the fiber holder, first means for holding the laser element, second means for holding the lens, first fixing means for fixing the second means and the fiber holder to each other with the first surface made to receive the reshaped laser beam and with the optical and the predetermined axes substantially aligned, and second fixing means for fixing the first and the second means to each other with the reshaped laser beam made to focus substantially on the end surface through the block and the binder mass.

According to this invention, there is also provided a device for coupling a laser beam emitted by a laser element and having a first beam axis to a transmission medium, which comprises a beam converging lens having an optical axis and responsive to the laser beam for producing a reshaped laser beam having a second beam axis, first means having a first axial line for holding the laser element with the first beam axis made to substantially coincide with the first axial line, second means having a second axial line for holding the lens with the optical axis rendered substantially coincident with the second axial line, and fixing means for fixing the first and the second means to each other with the first and the second axial lines substantially aligned to couple the reshaped laser beam to the transmission medium along the second beam axis.

DESCRIPTION OF THE PREFERRED EMBODIMENTS

Figure 1:
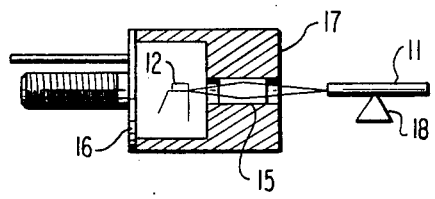
FIG. 1 schematically illustrates a side view of a device according to a first embodiment of the instant invention, partly in axial section and in combination with a laser element and an optical fiber.
Figure 2:
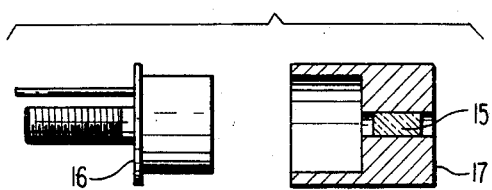
FIG. 2 schematically shows an exploded side view of a holder for the laser element and a lens holder for use in the device illustrated in FIG. 1, with the lens holder depicted in axial section.

Referring to FIGS. 1 and 2 of the accompanying drawing, a device according to a first embodiment of the present invention is for coupling a laser beam to an optical fiber 11 having an end surface. The laser beam is emitted by a laser element 12 as a divergent beam having a first beam axis. The device comprises a beam converging lens 15 for modifying or reshaping the laser beam into a convergent laser beam having a second beam axis, which is in general an extension of the first beam axis. The lens 15 is preferably a short piece of a "Selfoc" fiber described hereinabove. The "Selfoc" lens may be 1.5 mm in diameter and 3.8 mm long. A first holder 16 has a first axial line, which may not necessarily be an axis of symmetry or something like that but may merely be for defining a rectilinear line. The first holder 16 is preferably made of metal and provided with a window (not shown) transparent to the laser beam emitted by the laser element 12 to serve as a hermetic housing or package for the element 12. At any rate, the first holder 16 holds the laser element 12 with the first beam axis made to substantially coincide with the first axial line. A second holder 17 similarly has a second axial line and is preferably made of metal. The second holder 17 is for holding the lens 15 with the optical axis rendered substantially coincident with the second axial line. The lens 15 may be fixed to the second holder 17 by an adhesive or binder, such as an epoxy resin, A third holder 18 is preferably made of metal. As will later be described more in detail, the third holder 18 is for holding the opticl fiber 11 with the end surface exposed to outside.

In FIG. 1, the first and the second holders 16 and 17 are fixed to each other with the first and the second axial lines substantially aligned and with the reshaped laser beam made to converge at a focal point on the second beam axis. Either solder or an adhesive or binder, such as an epoxy resin, is preferably used for the fixing. Alternatively, the first and the second holders 16 and 17 are fixed to each other by means of machine screws or screw threads (not shown) or otherwise releasably fixed to each other. The second and the third holders 17 and 18 are now fixed to each other either by solder or an adhesive, such as an epoxy resin, with the focal point placed substantially on the end surface of the optical fiber 11. As will be described later, the second and the third holders 17 and 18 are brought into engagement with each other preferably with a clearance left therebetween so that the positions of the second and the third holders 17 and 18 may be subjected to fine adjustment relative to each other to position the focal point as exactly on the optical fiber end surface as possible.

Figure 3:
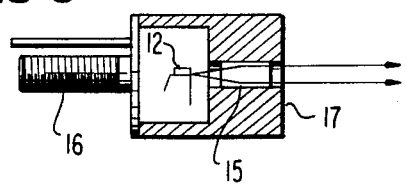
FIG. 3 schematically shows a side view of a device according to a second embodiment of this invention, partly in axial section and together with a laser element.

Referring now to FIG. 3, a device according to a second embodiment of this invention is for coupling a laser beam to a general transmission medium, such as air, and comprises similar parts designated by like reference numerals. The first and the second holders 16 and 17 are fixed to each other with the first and the second axial lines substantially aligned and with the reshaped laser beam rendered substantially parallel to the second beam axis.

Figure 4:
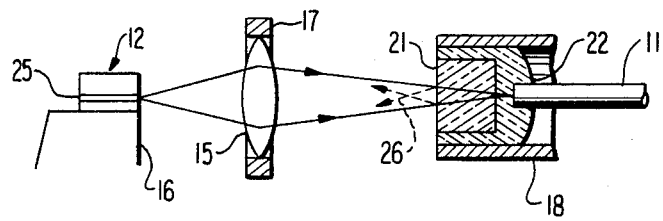
FIG. 4 is a schematic side view of a device according to a third embodiment of this invention, a laser element, and an optical fiber.

Turning to FIG. 4, a device according to a third embodiment of this invention is similar to that illustrated with reference to FIGS. 1 and 2 and comprises similar parts designated again by like reference numerals. It should be understood that the first holder 16 and the lens 15 are fixed to each other as described in conjunction with FIGS. 1 and 2 although it is now unnecessary that the lens 15 be held by the second holder 17. The third holder 18 will now be called a fiber holder. As pointed out hereinabove, an optical fiber, such as 11, is usually covered with a sheath of a polyamide resin known as nylon. It is therefore next to impossible to cover the end surface of the optical fiber 11 with a nonreflecting coating, such as a hard coat of magnesium fluoride or the like, that has to be coated on the end surface at a high temperature nearly equal to 500° C. A block or plate 21 of a solid material, such as glass, quartz, or sapphire, is therefore fixed to the optical fiber end surface by a mass 22 of an adhesive or binder, such as an epoxy resin, according to an aspect of this invention. More particularly, the block 21 has a first and a second surface. The second surface is fixed to the end surface and to the fiber holder 18 by the binder mass 22. Both the solid material and the binder should be transparent to the reshaped laser beam, namely, to the laser beam emitted by the laser element 12. It is usual that the solid material and the binder have refractive indexes that are approximately equal to that of the optical fiber 11. The lens 15 and the fiber holder 18 are fixed to each other with the first surface made to receive the reshaped laser beam and with the reshaped laser beam made to focus substantially on the end surface through the block 21 and the binder mass 22. An active layer of the laser element 12 is depicted at 25.

Further referring to FIG. 4, the refractive index of quartz or glass is from 1.4 to 1.5 and that of epoxy resins, about 1.5. From 2.8 to 4.0°/o of the laser beam incident on the optical fiber end surface is reflected by the end surface in a conventional arrangement. In contrast, the laser beam reflected by the end surface of the optical fiber 11 is only from 0.00 to 0.12°/o of the laser beam incident thereon in a device of the type being illustrated. This means that the reflected laser beam that returns to the laser active layer 25 to adversely affect the laser operation is reduced to about 1/20 to 1/30 in the illustrated device as compared with conventional arrangements. It is true that the laser beam is partly reflected by the first surface of the block 21. Most of the reflected laser beam is, however, directed as exemplified by dashed lines 26 so as not to return to the active layer 25 when the block 21 is about 0.5 mm or more thick.

Figure 5:
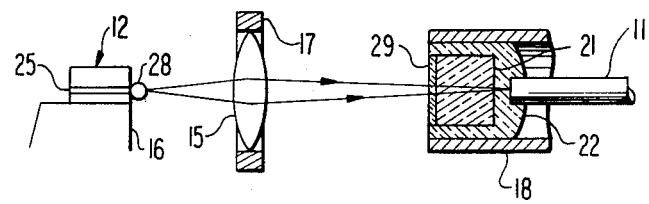
FIG. 5 is a schematic side view of a device according to a fourth embodiment of this invention, a laser element, and an optical fiber.

Referring to FIG. 5, a device according to a fourth embodiment of this invention comprises similar parts designated by like reference numerals as in FIG. 4. The first holder 16 comprises a cylindrical lens 28 for rendering the laser beam emitted from the active layer 25 only slightly divergent. The block 21 is covered with a known nonreflecting coating 29 at least at a portion of the first surface at which the reshaped laser beam is received. A device of the type being illustrated is preferred either when the reshaped laser beam is incident on the first surface with a small angle of convergence or when the block 21 is only from 0.2 to 0.3 mm thick.

Figure 6:
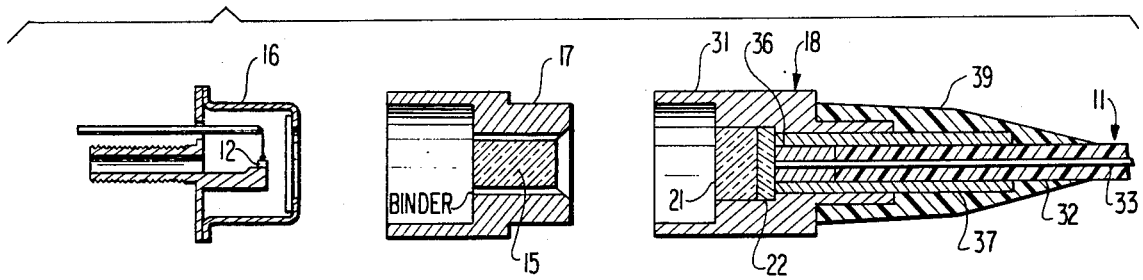
FIG. 6 is an exploded schematic axial sectional view of a device of the type depicted in FIG. 4, a laser element, and an optical fiber.

Referring now to FIG. 6, a device is of the type illustrated with reference to FIG. 4 and comprises similar parts designated by like reference numerals. A package for the laser element 12 serves as the first holder 16. The lens 15 is again held by a second holder 17. The third or fiber holder 18 comprises a metal block 31 having a central bore for holding the optical fiber 11 with the end surface exposed to a hollow space in the central bore and situated on a predetermined axis, which is not necessarily predetermined relative to the fiber holder 18 or the metal block 31 but is determined by the end surface of the optical fiber 11 held by the fiber holder 18 as will presently be described. The above-mentioned sheath has a diameter of about 0.9 mm and is depicted at 32 around a guide 33 of the optical fiber 11. A short glass or metal tube 36 is substituted for a portion of the sheath 32 that is near to the end surface. Either a glass capillary or a stainless steel tube available at present has the desired dimensions. The optical fiber 11 to which the glass or metal tube 36 is combined is now put through a long glass or metal tube 37. The tubes 36 and 37 are fixed to the optical fiber 11 with an adhesive, such as an epoxy resin, to provide an optical fiber end portion assembly. The end surface of the optical fiber guide 33 is polished optically flat. The assembly is received in the central bore of the metal block 31.

In the example illustrated in FIG. 6, the solid material block 21 is one-millimeter thick glass plate. The first and the second surfaces are polished optically flat. With a mass of an adhesive or binder, such as an epoxy resin, put on the second surface, the glass plate 21 is fixed to the optical fiber end surface and to the metal block 31. The mass put on the second surface becomes the binder mass 22. Although unnecessary, the glass plate 21 is snugly received in the central bore in the illustrated example. A tube 39 of a shrinkable resin is fixed to the metal block 31 and to an end portion of the optical fiber 11 to protect the fiber 11. The fiber holder 18 is now brought into engagement with the second holder 17 with the optical axis of the lens 15 and the predetermined axis of the fiber holder 18 substantially aligned. It is to be noted here that the substantial alignment as called herein should be understood in a broad sense as will become presently clear. More specifically, it is preferred that the second and the fiber holders 17 and 18 be brought into engagement with each other with a clearance left therebetween. This is for subjecting the positions of the holders 17 and 18 to fine adjustment relative to each other so as to position the focal point as exactly on the end surface of the optical fiber guide 33 as possible. After the fine adjustment, the second and the fiber holders 17 and 18 are fixed to each other with solder or an adhesive, such as an epoxy resin.

Further referring to FIG. 6, the distance between the second surface of the solid material block 21 and the end surface of the optical fiber guide 33 does not matter at all. It is not mandatory that the first and the second surfaces be optically flat particularly when the refractive index of the binder mass 22 is substantially equal to those of the block 21 and the optical fiber guide 33. When a block 21 having a pair of substantially parallel surfaces is fixed to the guide end surface with an actue angle formed between the parallel surfaces and the end surface the optical axis of the lens 15 and the predetermined axis of the fiber holder 18 are, exactly speaking, misaligned. The focal point is displaced dependent on the acute angle. This applies to a case where the block surfaces are not parallel to each other or where the first surface is either convex or concave. The order of assembling the whole device is immaterial. For instance, it is possible to preliminarily fix the lens 15 or the second holder 17 to the fiber holder 18 rather than to the first holder 16 and subsequently fix the first holder 16 either to the second holder 17 or directly to the fiber holder 18. Even in this case, it is also desirable that the first holder 16 and the second or the fiber holder 17 or 18 be brought into engagement with each other with a clearance left therebetween. In any event, it is readily possible by utilizing the clearance to place the focal point on the optical fiber end surface as exactly as possible either by actually measuring the laser beam coupled to the optical fiber 11 or by the aid of an electronic digital computer. With devices of the type being illustrated, it was possible to achieve the coupling with a loss of only from 3 to 6 dB.

Figure 7:
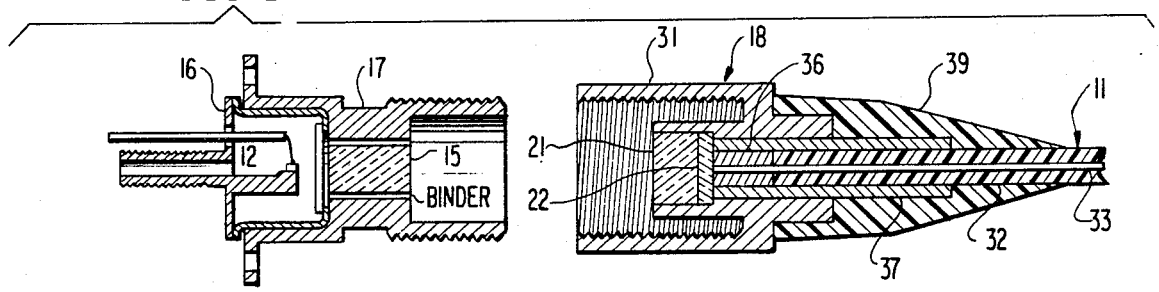
FIG. 7 is an exploded schematic axial sectional view of another device of the type illustrated in FIG. 4, a laser element, and an optical fiber.

Finally referring to FIG. 7, another device is again of the type described in conjunction with FIG. 4 and comprises similar parts designated by like reference numerals as in FIG. 6. The second and the fiber or third holders 17 and 18 are releasably fixed to each other by means of screw threads. The first and the second holders 16 and 17 are therefore preliminarily fixed to each other so that the focal point of the reshaped laser beam may be placed on the optical fiber end surface as exactly as possible when the second and the fiber holders 17 and 18 are coupled or fixed to each other to a predetermined extent.

While a few preferred embodiments of the present invention have thus far been described together with several modifications, it is now obviously possible to carry this invention into effect in various other ways. For example, it is possible to apply this invention to various devices for coupling a laser beam to an optical fiber which may be of the pigtail (FIG. 6) or the connector (FIG. 7) types. It is also possible in such devices to use a portion of the first or the third or fiber holder 16 or 18 as the second holder 17. The adhesive or binder, particularly that for the mass 22, may be any of known epoxy resins, acrylate resins, silicone resins, vinyl acetate resins, and phenol resins. The long glass or metal tube 37 may be fixed to the metal block 31 by the use of any one of such resins.

To establish a highly reliable optical fiber communication system, it is desircus that the reciever portion has the similar structure of the transmitter portion described hereinbefore. For this purpose, the structure of reliable reciever portion can be achieved by housing a photodetector such as avalanche photodiode within the same laser beam coupling structure in place of the laser element 12. In the foregoing described coupling structures, any opto-electrical elements replacing the laser element 12 may not lose the function of coupling between light beam and an opto-electrical element.

What is claimed is:

1. A device for coupling a laser beam emitted by a laser element to an optical fiber having an end surface, comprising:
   a beam converging lens responsive to said laser beam for producing a reshaped laser beam;
   a fiber holder for holding said optical fiber with said end surface;
   a block of a solid material transparent to said reshaped laser beam and having a first and a second surface;
   a mass of a binder transparent to said reshaped laser beam between said second and said end surfaces and between said second surface and said fiber holder; and
   fixing means for fixing said lens and said fiber holder to each other with said first surface made to receive said reshaped laser beam and with said reshaped laser beam made to focus substantially on said end surface through said block and said binder mass, wherein said solid material and said binder have refractive indexes that are approximately equal to that of said optical fiber.

2. A device as claimed in claim 1, wherein said fixing means comprises means for adjusting the positions of said lens and said fiber holder relative to each other.

3. A device as claimed in claims 1 or 2, the laser beam emitted by said laser element and said reshaped laser beam having a first and a second beam axis, respectively, said lens having an optical axis, further comprising:
   first means having a first axial line for holding said laser element with said first beam axis made to substantially coincide with said first axial line;
   second means having a second axial line for holding said lens with said optical axis rendered substantially coincident with said second axial line; and
   additional fixing means for fixing said first and said second means to each other with said first and said second axial lines substantially aligned.

4. A device as claimed in claim 1 wherein said block and said binder mass suppress feedback from said end surface to said laser element.

5. A device for coupling a laser beam emitted by a laser element to an optical fiber having an end surface, comprising:
   a beam converging lens having an optical axis and responsive to said laser beam for producing a reshaped laser beam;
   a fiber holder having a predetermined axis for holding said optical fiber with said end surface and situated on said predetermined axis;
   a block of a solid material transparent to said reshaped laser beam and having a first and a second surface;
   a mass of a binder transparent to said reshaped laser beam between said second and said end surfaces and between said second surface and said fiber holder;
   a hermetic laser package holding said laser element and having a transparent window opposing said lens;
   a lens holder for holding said lens;
   first fixing means for fixing said lens holder and said fiber holder to each other with said first surface made to receive said reshaped laser beam and with said optical and said predetermined axes substantially aligned; and
   second fixing means for fixing said laser package and said lens holder to each other with said reshaped laser beam made to focus substantially on said end surface through said block and said binder mass, wherein said solid material and said binder have refractive indexes that are approximately equal to that of said optical fiber.

6. A device as claimed in claim 5, wherein said second fixing means comprises means for adjusting the positions of said first and said second means relative to each other.

7. A device as claimed in claims 1, 2, 5, or 6, further comprising a nonreflecting coating at least on a portion of said first surface at which said reshaped laser beam is received.

8. A device for coupling a laser beam and having a first beam axis to a transmission medium, comprising:
   a beam converging lens having an optical axis and responsive to said light beam for producing a reshaped laser beam having a second beam axis;
   a hermetic package having a transparent window and a first axial line for holding a semiconductor laser element apart from said transparent window with said first beam axis made to substantially coincide with said first axial line;
   a lens holder having a second axial line and provided with a first opening elongated along said second axial line and a second opening adjacent to said first opening and elongated along said second axial line for holding said lens in said second opening with said optical axis rendered substantially coincident with said second axial line;
   said hermetic package being inserted into said first opening of said lens holder with said first and said second axial lines substantially aligned to couple said reshaped light beam to said transmission medium along said second beam axis.

9. A device as claimed in claim 8, wherein said beam converging lens is positioned at such a distance from said semiconductor laser element that said reshaped light beam is made to converge on said second beam axis.

10. A device as claimed in claim 8 wherein said beam converging lens is positioned at such a distance from said semiconductor laser element that said reshaped light beam is rendered parallel to said second beam axis.

11. A device for coupling a laser beam emitted by a semiconductor laser element to an optical fiber having an end surface, comprising:
    a fiber holder having a bore along a predetermined axis;
    an optical fiber having an end surface inserted into said bore with said end surface exposed and situated on said predetermined axis;
    a block of a solid transparent material inserted into said bore having a first and a second surface and refractive index approximately equal to that of said optical fiber, said second surface being disposed adjacent to said end surface;
    a mass of a transparent binder filled into said bore between said second surface and said end surface to fix said block and having refractive index approximately equal to that of said optical fiber;
    a lens holder partly inserted into said bore and having an opening along said predetermined axis;
    a beam converging lens fixed within said opening having third and fourth surfaces, said fourth surface opposing said first surface;

a hermetic laser package inserted into said opening having a transparent window opposing said third surface; and a laser element disposed within said hermetic laser package apart from said transparent window so as to pass a laser light through said transparent window along said predetermined axis.

12. A device for coupling a laser beam emitted by a semiconductor laser element to an optical fiber having an end surface, comprising:

a fiber holder having a bore along a predetermined axis;

an optical fiber having an end surface inserted into said bore with said end surface exposed and situated on said predetermined axis;

a block of a solid transparent material inserted into said bore having a first and a second surface and refractive index approximately equal to that of said optical fiber, said second surface being disposed adjacent to said end surface;

a mass of a transparent binder filled into said bore between said second surface and said end surface to fix said block and having refractive index approximately equal to that of said optical fiber;

a lens holder partly inserted into said bore and having an opening along said predetermined axis;

a beam converging lens fixed within said opening having third and fourth surfaces, said fourth surface opposing said first surface;

a hermetic laser package inserted into said opening having a transparent window opposing said third surface; and a laser element disposed within said hermetic laser package apart from said transparent window so as to pass a laser light through said transparent window along said predetermined axis wherein a relationship of said fiber holder, lens holder and hermetic laser package is so determined that said laser light is focused on said end surface of the optical fiber.

13. A device for coupling a laser beam emitted by a laser element to an optical fiber having an end surface, comprising:

a fiber holder having a bore along a predetermined axis;

an optical fiber having an end surface inserted into said bore with said end surface exposed and situated on said predetermined axis;

a block of a solid transparent material inserted into said bore having a first and a second surface and refractive index approximately equal to that of said optical fiber, said second surface being disposed adjacent to said end surface;

a mass of a transparent binder filled into said bore between said second surface and end surface to fix said block of solid transparent material and having refractive index approximately equal to that of said optical fiber;

a lens holder coupled to said fiber holder having an opening along said predetermined axis;

a beam converging lens fixed within said opening having third and fourth surfaces, said fourth surface opposing said first surface;

a hermetic laser package coupled to said opening having a transparent window opposing said third surface; and a laser element disposed within said hermetic laser package apart from said transparent window being so as to pass a laser light through said transparent window along said predetermined axis, wherein said fiber holder, lens holder and hermetic laser holder are fixed to each other so that said laser light is focused on said end surface of the optical fiber.

14. A device as claimed in claims 11, 12 or 13, wherein said fiber holer and lens holder are coupled to each other by means of screw threads.

15. A device as claimed in claim 14, wherein said optical fiber is a single fiber.

16. A device as claimed in claim 14, wherein said lens consists of a transparent cylindrical rod having a refractive index varied along its radius.

17. A device as claimed in claims 11, 12, or 13, wherein said optical fiber is a single fiber.

18. A device as claimed in claim 17, wherein said lens consists of a transparent cylindrical rod having a refractive index varied along its radius.

19. A device as claimed in claims 11, 12, or 13, wherein said lens consists of a transparent cylindrical rod having a refractive index varied along its radius.

* * * * *